United States Patent [19]
Guidon et al.

[11] Patent Number: 5,375,160
[45] Date of Patent: Dec. 20, 1994

[54] INTERFACE APPARATUS FOR EFFECTING CAPTIONING AND COMMUNICATIONS BETWEEN A TELEPHONE LINE AND A TELEVISION

[75] Inventors: John Guidon, Agoura Hills; Douglas J. Easton, Woodland Hills; Merle D. Moore, Northridge, all of Calif.

[73] Assignee: Ledler Corporation, Burbank, Calif.

[21] Appl. No.: 68,740

[22] Filed: May 28, 1993

[51] Int. Cl.$^5$ .................................. H04M 11/00
[52] U.S. Cl. ............................. 379/52; 379/90; 348/468
[58] Field of Search ............... 379/52, 90, 93, 96–99; 358/85, 142, 143, 147; 348/14, 22, 460, 461, 468, 478; H04N 5/278, 5/265, 5/445, 7/08, 7/087

[56] References Cited

U.S. PATENT DOCUMENTS

| | | |
|---|---|---|
| 3,896,267 | 7/1975 | Sachs et al. .................. 379/52 |
| 4,288,809 | 9/1981 | Yabe . |
| 4,337,485 | 6/1982 | Chambers . |
| 4,380,027 | 4/1983 | Leventer et al. . |
| 4,388,645 | 6/1983 | Cox et al. . |
| 4,595,951 | 6/1986 | Filliman . |
| 4,595,952 | 6/1986 | Filliman ...................... 358/142 |
| 4,633,297 | 12/1986 | Skerlos et al. . |
| 4,751,578 | 6/1988 | Reiter et al. . |
| 4,803,551 | 2/1989 | Park . |
| 4,862,268 | 8/1989 | Campbell et al. . |
| 4,894,789 | 1/1990 | Yee . |
| 4,954,882 | 9/1990 | Kamemoto ................ 358/147 |
| 5,008,750 | 4/1991 | Gomikawa ................. 358/147 |
| 5,036,394 | 7/1991 | Morii et al. . |
| 5,181,113 | 1/1993 | Chang ....................... 358/147 |
| 5,200,823 | 4/1993 | Yoneda et al. ............. 358/147 |

*Primary Examiner*—Wing F. Chan
*Attorney, Agent, or Firm*—Merchant, Gould, Smith, Edell, Welter & Schmidt

[57] ABSTRACT

A telecommunications device is disclosed which provides TDD services for the hearing impaired as well as other closed-captioning services. Incoming data is displayed over the television picture and may be stored in memory for review by the receiving party at a later time if desired.

16 Claims, 3 Drawing Sheets

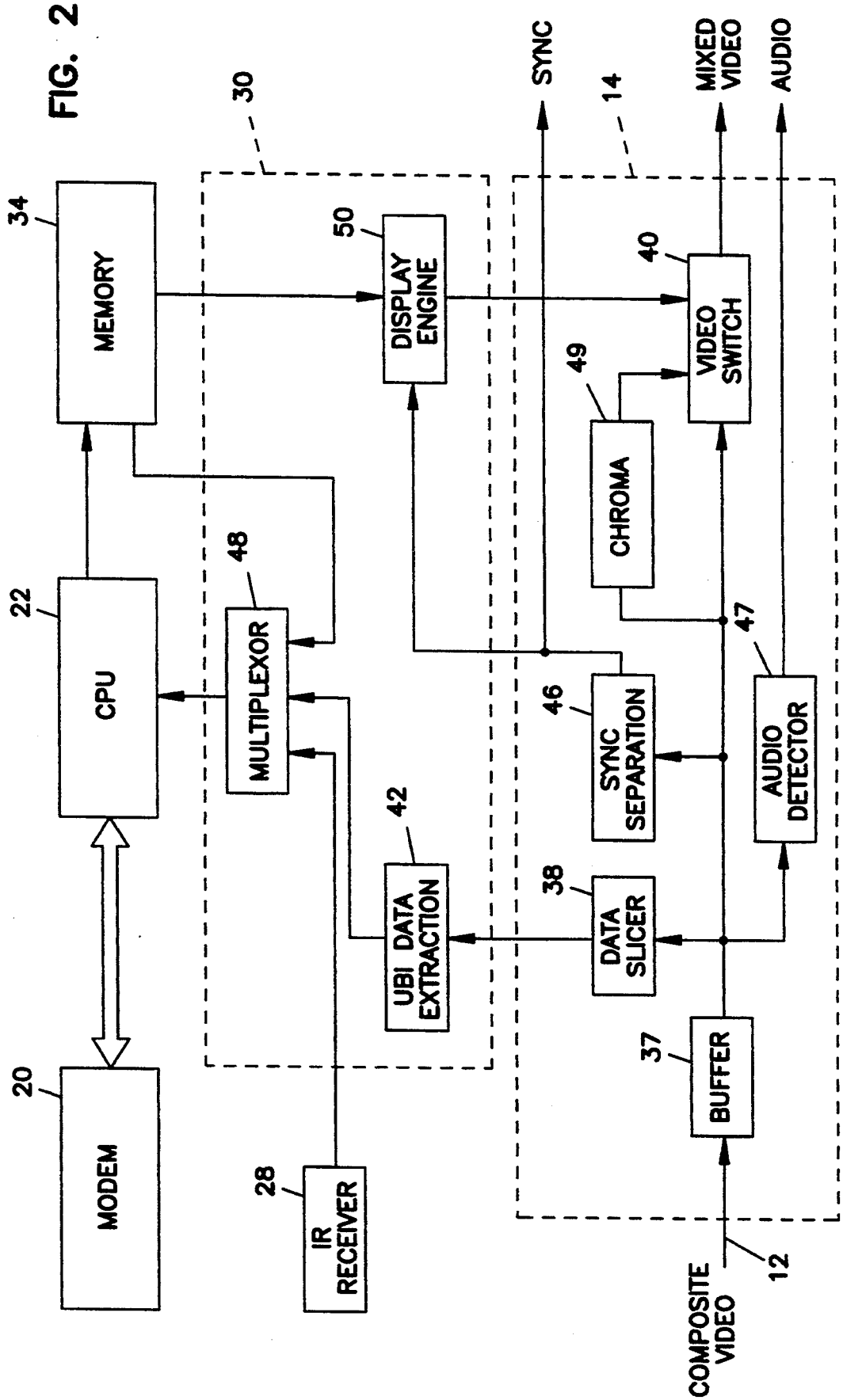

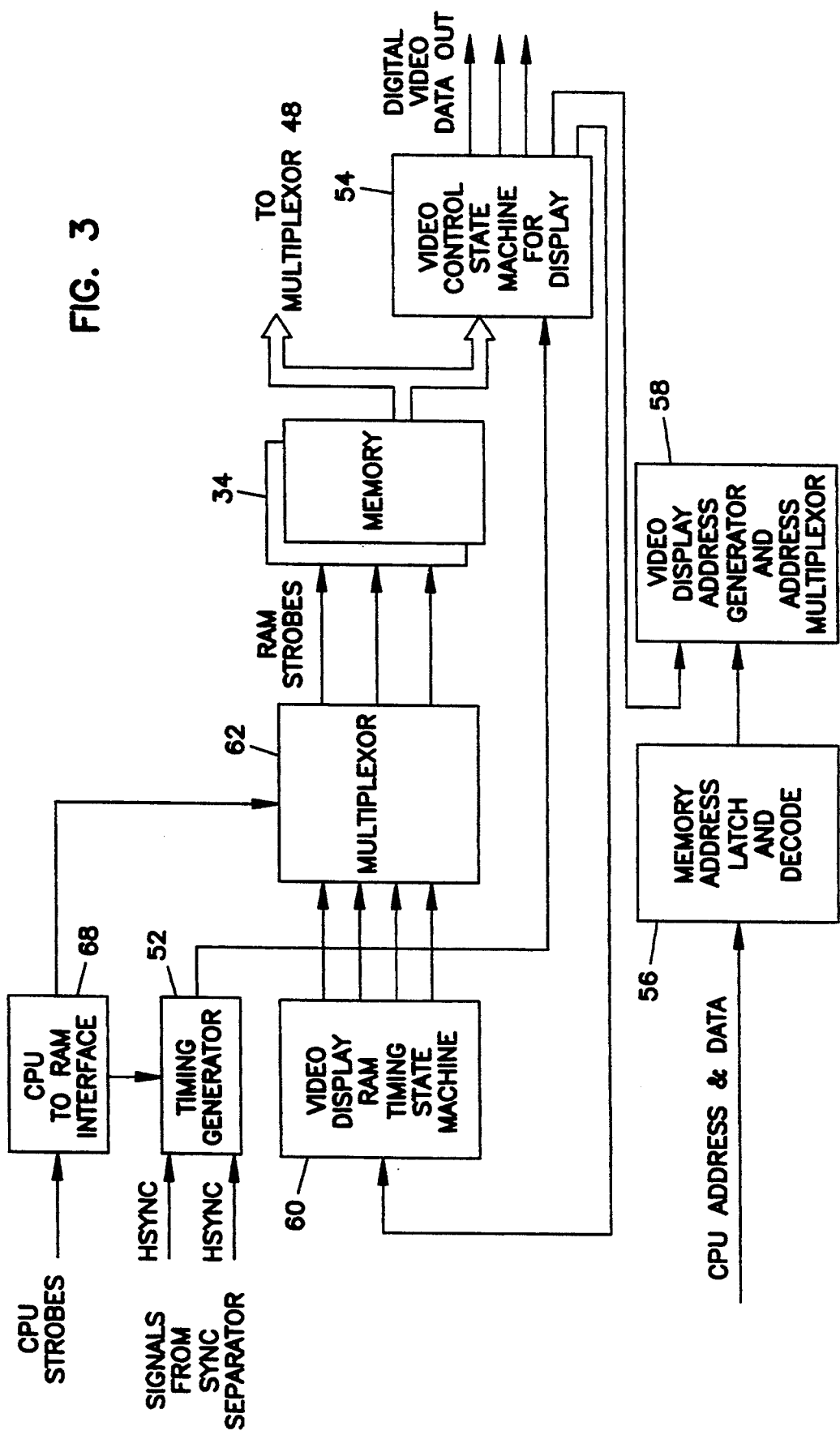

INTERFACE APPARATUS FOR EFFECTING CAPTIONING AND COMMUNICATIONS BETWEEN A TELEPHONE LINE AND A TELEVISION

BACKGROUND OF THE INVENTION

1. Field of the Invention

This invention relates generally to telecommunications systems, and more particularly to an apparatus that utilizes a standard television set for displaying information including information sent over a telephone subscriber loop.

2. Description of Related Art

A telecommunication device known as a telecommunications device for the deaf (TDD) enables the hearing impaired to communicate over regular telephone subscriber loops. The most common TDD includes a keyboard for typing outgoing messages, a modem (modulator/demodulator) for converting incoming and outgoing messages to signals which can be transceived over the subscriber loop, and a display CRT screen or printer for displaying the messages. While this type of TDD has been used for a number of years, it is accompanied by a number of limitations.

One limitation is the amount of components and cost required to construct such a device. Another limitation is that a non-audio indicator is needed to indicate an incoming call. This typically is accomplished by adapting the TDD to flash a room lamp in response to an incoming call. Moreover, while some TDDs include a printer for recording a message, most TDDs which encode messages in Baudot, ASCII, or CCITT formats, cannot utilize conventional answering devices.

It is known that many television channels include digital information for the purpose of closed captioning. Closed captioning is a means for transmitting hidden digital data in the unused portions of the television signal. The information is inserted in digital form onto unused lines, the so-called vertical blanking interval (VBI) portion of the television picture. On the receiving end, a decoder extracts the digital information and reintegrates it with the regular video signal for display on the television screen. The television receiver thus acts as a display terminal which converts digital information into text for display on the television screen.

One known format for closed-captioning is the Teletext system. The Teletext system authorized by the Federal Communication Commission (FCC) defines the data as being imbedded in lines 10 through 18 of the VBI with the transmission rate being dependent upon the number of lines used to transmit the data. Teletext systems are available which send an endless loop data corresponding to magazines, books, electronic yellow pages and the like. Provisions can be made to store a portion of this data in a personal computer for later review. The Teletext system, while being accepted in the European communities, never gained popularity in the United States due to the transmission complexity and the requirement that it be adapted to NTSC standards. Furthermore, the Teletext system does not provide color text, alternative text placement, or support multiple languages.

A new closed captioning specification (FCC 15.119), herein incorporated by reference, has been proposed by the Electronic Industry Association which utilizes the vertical blanking interval wherein captions associated with the television program are encoded into the composite video signal during line 21 of field one of the standard NTSC video signal. The proposed system further provides for color text and includes control information which provides instructions for the display format as well as the characters to be displayed.

While this new format is certainly useful to the hearing impaired, it also has benefits in instructional applications where reliance on the spoken word is not desired. One such example would be to teach or improve the context in which language is used or to improve reading capabilities.

Up until now, these seemingly unrelated technologies have not taken advantage of the substantial overlap between TDD and closed captioning and the benefits from joining the two together. It can be seen then that an apparatus which provides both TDD services and closed-captioning in a standard television receiver would provide a convenient platform for the hearing impaired to communicate as well as provide a benefit to society as a whole.

SUMMARY OF THE INVENTION

To overcome the limitations in the prior art described above, and to overcome other limitations that will become apparent upon reading and understanding the present specification, the present invention discloses a self contained electronic unit that connects to a standard telephone subscriber loop and between a RF signal source and the RF input on a television receiver or video cassette recorder (VCR). The unit includes a modem for receiving digital data over the subscriber loop and a decoder for decoding hidden data in the television signal. The data from either the subscriber loop or television signal is selectively overlaid on the original video signal for viewing on a standard television receiver. The unit, while easily adaptable for other broadcasting schemes, is compatible with standard NTSC broadcasts and HRC cable channel broadcasts and conforms to the proposed closed captioning specification FCC 15.119.

A normal TV mode, pop-on caption rollup caption mode, and paint-on caption mode, are all provided as well as extended features including a split display of incoming and outgoing TDD conversations, optional increase of the caption size, transcript recording, and a background text mode. The unit may save captions in transcript form from a TV program, or from background information unrelated to the TV program, or from a TDD conversation for later viewing. The transcript can then be linked to a computer or printer for permanent storage.

The unit is housed in a small enclosure and includes a wireless remote control and a front switch panel for user control. The front panel includes a display to indicate the status and the mode of operation. Subscriber loop and RF connections are provided on the rear panel. The remote control operates like a TV remote unit as well as a wireless TDD keyboard. The remote and the front panel include buttons for selecting between the caption, the background text, and the TDD modes; for choosing between the caption channels; and for changing the TV channel. A pop up menu selection on the screen is provided to prompt the user in making the choice.

TDD operation is provided in response to the detection of a ring signal and a carrier signal over the telephone subscriber loop. The unit may be set to power the television receiver on in response to a preselected number of rings or may be set to answer, announce unavailability, and record an incoming message. The present invention displays an icon on the TV screen to alert that an incoming call is being received which the receiving party may acknowledge via the remote control. In the event that the receiving party is not available or elects not to answer the call, the unit may be programmed to an unattended mode for responding with a digital message. The message prompts the calling party to leave a message much like that of a conventional voice activated answering machine. The receiving party is then prompted and reminded by a screen icon that a message has been left. The calling party's message is stored in memory for retrieval and viewing at the receiving party's option.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described specific examples of devices and methods in accordance with the invention.

BRIEF DESCRIPTION OF THE DRAWING

Referring now to the drawing in which like reference numerals and letters indicate corresponding elements throughout the several views:

FIG. 2 depicts a more detailed block diagram of the digital and analog processors depicted in FIG. 1; and FIG. 3 depicts a more detailed block diagram of the display engine depicted in FIG. 2.

DETAILED DESCRIPTION OF THE PREFERRED EMBODIMENT

Figure 1:
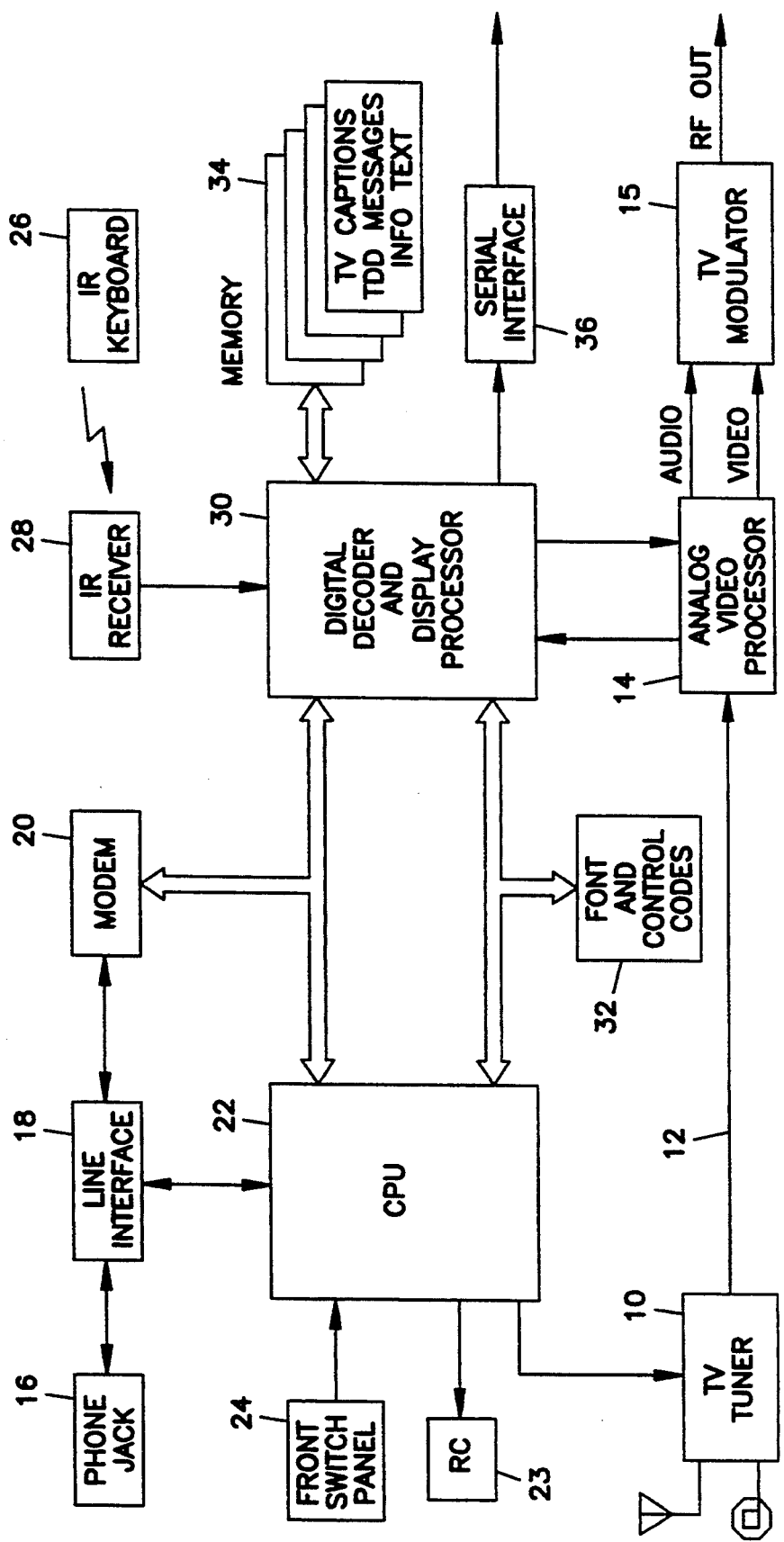
FIG. 1 depicts an overall block diagram of the invention, which is further detailed in FIGS. 2 and 3.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Reference is now made to FIG. 1 which depicts a general block diagram of the present invention. A TV tuner 10 having switchable coaxial and dipole antenna inputs for receiving TV broadcasts, provides a composite video signal on output line 12. Many suitable expedients are known for sources of composite video for which the principles of the present invention may be practiced. In the preferred embodiment, the TV tuner 10 is an integrated circuit module from the ALPS Corporation. Output line 12 is coupled into an analog video processor 14 which slices VBI and sync data from the composite video signal for use by the digital decoder and display processor 30, and integrates caption or TDD data into the video stream, all discussed in more detail hereinbelow. The digital decoder and display processor 30 receives the caption data and sync signals from the analog video processor 14 and routes synchronized pixel information representative of the caption or TDD data back into the video stream. Reintegrated video and audio outputs from the analog video processor 14 are coupled to a TV modulator 15 for modulation at a RF frequency, preferably at a frequency of channel 3 or 4 in the VHF TV band. The output of TV modulator 15 is coupled to the RF input of a standard TV set. In the preferred embodiment of the present invention, the TV modulator 15 is a MC1374 integrated circuit from Motorola Corporation. Those skilled in the art will be able to bring to mind other suitable expedients for the TV modulator 15 for which the principles of the present invention may be practiced.

A telephone subscriber loop connection 16 preferably of the RJ-11 type, couples the present invention to the telephone network. Line interface 18 which includes an isolation transformer, ring detector, and controllable relays, isolates a modem 20 from the subscriber loop. The line interface 18 is controlled by the modem 20 and the CPU 22 which sense ring and modem carrier signals and provide an off-hook signal to properly terminate the subscriber loop in response thereto. The modem 20 adjusts its baud rate to that of the incoming call, and sends a signal to the CPU 22 to activate a wake-up relay 23 that switches an AC power supply on, preferably to activate the TV set. Many expedients are known for the line interface 18, the specific details not being necessary for the understanding of the present invention. In the preferred embodiment of the present invention, the modem 20 is a single chip Bell 212A/103 circuit such as, but not limited to, the SSI 73K212 integrated circuit from Silicon Systems Corporation of Tustin, Calif. Likewise, the CPU 22 in the preferred embodiment is a Z8691 microcontroller from Zilog Corporation of Campbell, Calif. It should be understood that other suitable modems and CPUs may be substituted without departing from the scope of the present invention.

A display and switch panel 24 preferably of a thin membrane type, is located on the front of the present invention. It provides inputs to the CPU 22 so that the user may, among other things, power the unit off and on, change the TV channels, select which mode to operate in, and to select the captioning size. An infrared keyboard 26 preferably of a tactile type, in addition to providing the wireless functions provided by the front panel 24, provides a QWERTY type keyboard for TDD input. An infrared receiver 28 receives the signals from the keyboard 26 and delivers digital data to the digital display processor 30 described in more detail hereinbelow. Many expedients are known for infrared transmitters and receivers, the particular structural details not being necessary for the understanding of the present invention.

A read only memory (ROM) 32 stores font, language, and control codes for interpreting incoming VBI or TDD data. Control codes identify italics, normal or enlarged font, underlining, indentation, blinking or the color of the text. The CPU 22 addresses the ROM 32 as a look up table to determine the appropriate strokes to send to the digital display processor 30 in processing the text. The CPU 22 also performs the steps necessary for transferring data to and from memory 34 and readdresses the memory 34 for the rollup display. In general, the CPU 22 performs the overhead of providing captioning including checking for parity errors in the data, interpreting the control and color codes, and setting the display mode. The CPU 22 is coupled through the digital decoder and display processor 30 to memory 34 for selective retrieval by the user of stored data. The data includes the TDD messages, TV captions, and ancillary text not related to the underlying TV program, herein referred to as Infotext. Infotext is identified by a special preamble control code which is decoded by the CPU 22 in ROM 32. Infotext operates in the background to the other modes. The CPU 22 stores the Infotext data in memory 34 until the user requests it. Upon request, the CPU 22 displays a menu listing the available Infotext currently stored in memory 34. The CPU 22 displays an icon on the TV screen to alert that an incoming call is being received which the receiving party may acknowledge via the remote control 26. Through the wireless TDD keyboard, the CPU 22 may be programmed to operate in a number of modes including an unattended mode wherein the unit is set to answer, announce an unavailability, and record an incoming message. The CPU 22 prompts the user that a message has been left with a screen icon.

Standard captioning is provided by the CPU 22 with a pop-on mode wherein the incoming data is stored in memory 34 until a control code is received by the CPU 22 and matched in ROM 32. The CPU 22 then sends the appropriate strokes to the digital display processor 30 to pop the caption onto the screen. The caption remains until the CPU 22 receives an erasure code or a new caption. In the rollup caption mode, the CPU 22 causes the digital display processor 30 to display the characters on the screen as they are received. New text causes the old text to roll up and off the screen. In a record mode, the CPU 22 operates analogous to a VCR wherein the time to start, stop, the TV channel, and caption channel to record are entered by the user to record transcripts of the TDD or captioning data. A serial interface 36 is provided through the digital processor 30 to the CPU 22 for linking data stored in memory 34 to a permanent memory device or to a printer.

Reference is now made to FIG. 2 which depicts a more detailed block diagram of the digital and analog processors. The analog video processor 14 includes a buffer 37 for buffering incoming composite video signals on line 12. It further includes a data slicer 38 having an adaptable slicer level, for slicing digital data out of the VBI in the composite video signal. In the preferred embodiment, the data is encoded in line 21 and includes control codes for controlling the display characteristics of the text. The sliced digital data is sent as serial data to a VBI data extractor 42 in the digital decoder and display processor 30. The data extractor 42 receives the serial data, accumulates it into a preselected number of parallel bits, preferably eight, then outputs the parallel word via a multiplexor 48 to the CPU 22.

The analog processor 14 further includes a sync separator 46 for separating the sync signals from the composite video and converting them to digital levels for use in the digital processor 30. The analog processor 14 also includes an audio detector 47 and a chroma demodulator 49 for extracting audio and chroma information respectively from the video stream. A video switch 40 in the analog processor 14 receives luminance information from the buffer 37 and chrominance information from the chroma demodulator 49 and from the display engine 50. The video switch 40 selectively inserts pixel data stored in memory 34 representative of caption or TDD data to form a video signal which includes overlaid text. The sync signals from sync separator 46 are routed to the display engine 50 for providing timing signals.

Reference is now made to FIG. 3 which depicts a more detailed block diagram of the display engine 50. Timing generator 52 receives horizontal and vertical sync inputs from the sync separator 46 in analog processor 14 and from CPU-RAM interface 68. CPU-RAM interface 68 receives strobes from CPU 22 and converts them to DRAM compatible strobes required by memory 34. State machine 54, being synchronized by timing generator 52, reads a virtual screen stored in memory 34 synchronously with the composite video coming out of the TV tuner 10. State machine 60 is coupled to state machine 54 and provides video display and RAM timing signals to multiplexor 62. Multiplexor 62 is controlled by CPU-RAM interface 68 for selectively providing strobe signals to the appropriate sections in memory 34.

Memory address latch and decoder 56 are coupled to the address and data bus of CPU 22. The decoder 56 decodes the memory address that the CPU 22 desires to access. Multiplexor 58, receives addresses from decoder 56 and timing information from state machine 54, and provides the requisite address for access to memory 34 by either the CPU 22 or state machine 54.

If captioning is to start for example at line 43 on the TV screen, reading of the memory 34 by state machine 54 begins on the 43rd horizontal sync pulse received by timing generator 52 and the contents of memory 34 is read out and presented to the video switch 40 in the analog video processor 14 as digitally created luminance and chrominance information. The switch 40 inserts this information in the video stream thus causing the stored text to be overlaid on top of the existing video.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A captioning unit for use with a television receiver comprising:
   a modem for receiving and transmitting digital data over a telephone subscriber loop and for providing telecommunications device for the deaf (TDD) data and operation;
   a composite video signal source;
   an analog video processor, coupled to the composite video signal source, for slicing hidden caption data in a vertical blanking interval, separating sync data from the composite video signal and selectively overlaying the caption and TDD data on the composite video signal;
   a digital decoder and display processor, having inputs coupled to the analog video processor for decoding the caption data and having an output for inserting data from a volatile memory representative of luminance and chrominance information of the caption and TDD data;
   link interface means, coupled to the modem, for isolating the modem from the telephone subscriber loop and for detecting rings; and
   a CPU coupled to the modem, the display processor, the link interface means and the memory, for setting selective display modes for answering, announcing unavailability, and recording an incoming message in response to a preselected number of rings, for displaying an icon to alert that an incoming call is being received and to indicate that a message has been left.

2. A captioning unit as recited in claim 1 wherein the video processor further includes a switch having inputs coupled to luminance and chrominance information in the composite video signal source and to the luminance and chrominance information stored in the memory, the switch providing a video signal output which overlays the caption and TDD data on the composite video signal.

3. A captioning unit as recited in claim 1 further comprising a wireless remote control unit and receiver for sending TDD information and control inputs to the CPU.

4. A captioning unit as recited in claim 1 wherein the CPU further includes means for increasing the display size of the caption or TDD data.

5. A captioning unit as recited in claim 1 wherein the CPU further includes transcript means for saving captions and TDD information in a form of a transcript.

6. A captioning unit as recited in claim 1 wherein the CPU further includes means for decoding caption data in the composite video signal which is unrelated to the underlying program.

7. A captioning unit as recited in claim 1 wherein the CPU further includes means for providing a pop up menu selection on the television screen to prompt a user in making a selection choice.

8. A captioning unit as recited in claim 1 further including an interface for loading data in the volatile memory into permanent storage.

9. A captioning unit as recited in claim 1 further comprising means for powering on the television receiver in response to a preselected number of rings.

10. A self contained electronic unit coupled to a standard telephone subscriber loop and between a radio frequency (RF) signal source and a RF input on a television receiver comprising:
(a) a TV tuner for receiving a RF signal TV broadcast and providing a composite video signal output;
(b) a line interface coupled between the telephone subscriber loop and a modem for isolating the modem from the subscriber loop and for properly terminating the subscriber loop in response to a predetermined number of rings and detection of a data carrier signal;
(c) an analog video processor, coupled to the TV tuner, for slicing VBI caption data and for separating sync data from the composite video signal;
(d) a digital decoder and display processor, coupled to the analog video processor, for receiving the vertical blanking interval (VBI) caption data and sync signals and for routing synchronized pixel information representative of caption or telecommunications device for the deaf (TDD) data to the analog video processor for mixing into composite video signal output;
(e) a TV modulator, coupled to the analog video processor, for modulating the mixed video signal at a RF frequency; and
(f) a CPU for performing general overhead including parity checking in the data, interpreting control and color codes, for answering announcing unavailability, and recording an incoming message in response to a preselected number of rings, and in response to detecting a modem carrier signal, activating a wake-up relay for switching an AC power outlet on.

11. A self contained electronic unit as recited in claim 10 further comprising a serial interface through the digital processor to the CPU for linking data stored in memory to a permanent memory device.

12. A self contained electronic unit as recited in claim 10 wherein the analog video analog video processor comprises:
(i) a buffer for buffering incoming composite video signals;
(ii) a data slicer having an adaptable slicer level, for slicing digital data out of the VBI in the composite video signal;
(iii) a sync separator for separating composite sync signals from the composite video and converting the signals to digital levels for use in the digital processor;
(iv) an audio detector and a chroma demodulator for extracting audio and chroma information from the video stream respectively; and
(v) a video switch for receiving luminance information from the buffer and chrominance information from the chroma demodulator and selectively inserts pixel data stored in memory representative of caption or TDD data to form an aggregate video signal.

13. A self contained electronic unit as recited in claim 10 wherein the digital decoder and display processor comprises:
(i) a VBI data extractor, for receiving serial data from the analog video processor, accumulating the data into a preselected number of parallel bits, and outputting the parallel bits to the CPU;
(ii) a display engine including a timing generator coupled to the analog processor;
(iii) a CPU-RAM interface for receiving strobes from the CPU and converting the strobes to DRAM compatible strobes;
(iv) a first state machine coupled to the timing reference, for reading a virtual screen stored in memory;
(v) a second state machine for providing video display and RAM timing signals; and
(vi) a memory address latch and decoder, coupled to the CPU, for decoding a desired memory access address.

14. A self contained electronic unit as recited in claim 10 further comprising a display and switch panel for providing inputs to the CPU so that a user may power the unit on, change TV channels, select which mode to operate in, and select captioning size.

15. A self contained electronic unit as recited in claim 10 further comprising an infrared receiver for receiving signals from a QWERTY type keyboard and for providing digital data representative of the signals to the CPU and to the digital decoder and display processor.

16. A self contained electronic unit as recited in claim 10 further comprising a read only memory, coupled to the CPU, for storing fonts, alternative languages, and control codes for interpreting the caption and TDD data.

* * * * *